United States Patent [19]

Morino et al.

[11] Patent Number: 4,518,882
[45] Date of Patent: May 21, 1985

[54] ELECTROMAGNETIC LINEAR DRIVING DEVICE

[75] Inventors: Seiji Morino, Okazaki; Hisasi Kawai, Toyohashi, both of Japan

[73] Assignee: Nippon Soken, Inc., Nishio, Japan

[21] Appl. No.: 510,303

[22] Filed: Jul. 1, 1983

[30] Foreign Application Priority Data

Jul. 12, 1982 [JP] Japan .................... 57-119848

[51] Int. Cl.³ ............................................. H02K 33/00
[52] U.S. Cl. ........................................ 310/15; 310/12; 310/13
[58] Field of Search ................. 310/15, 50, 27, 13, 310/12

[56] References Cited

U.S. PATENT DOCUMENTS

| 2,409,857 | 10/1946 | Hines et al. | 310/15 |
| 3,133,214 | 5/1964 | Lawson et al. | 310/15 |
| 3,504,320 | 3/1970 | Engdahl et al. | 310/15 X |
| 3,943,443 | 3/1976 | Kimura et al. | 310/15 X |
| 4,140,932 | 2/1979 | Wohlert | 310/15 |
| 4,260,914 | 4/1981 | Hertrich | 310/15 X |

Primary Examiner—Donovan F. Duggan
Attorney, Agent, or Firm—Cushman, Darby & Cushman

[57] ABSTRACT

An electromagnetic linear driving device comprising a stationary magnetic member, a first winding wound around the stationary magnetic member along the longitudinal direction thereof, and a movable permanent magnet for generating a magnetic flux which links some turns of the winding. A second winding is wound around at least one terminal of the stationary magnetic member so as to generate a magnetic flux opposing the magnetic flux generated by the first winding.

8 Claims, 11 Drawing Figures

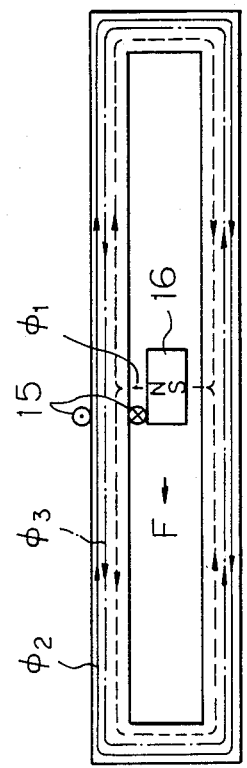
Fig. 5
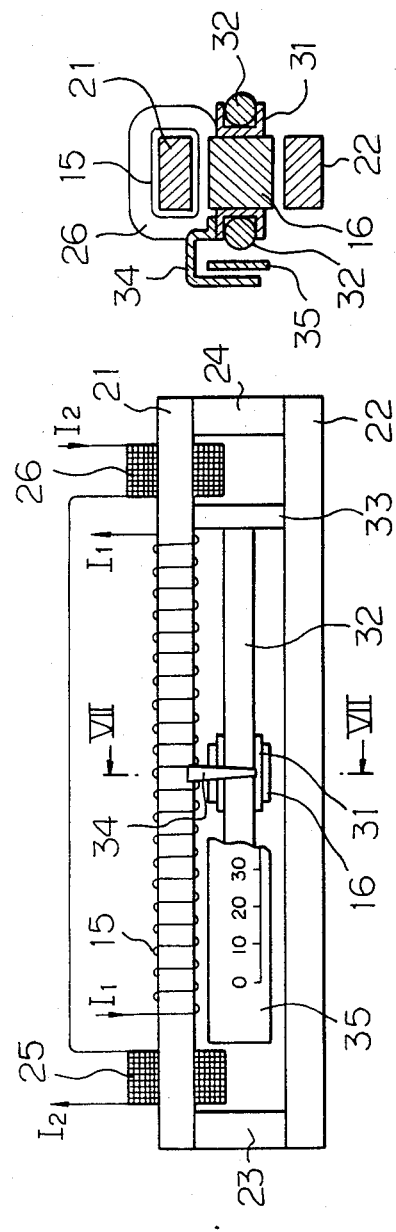
Fig. 7
Fig. 6

ELECTROMAGNETIC LINEAR DRIVING DEVICE

BACKGROUND OF THE INVENTION

1. Field of the Invention

The present invention relates to an electromagnetic linear driving device of a linear motor type, which is used as a speedometer or tachometer for automobiles, a driver for the linear tracking arm of record players, a driver for line printers, and the like.

2. Description of the Prior Art

A prior art electromagnetic linear driving device comprises a stationary magnetic member, a winding coiled around the stationary magnetic member in the longitudinal direction thereof, and a permanent magnet movable along the stationary magnetic member (See Japanese unexamined utility model publication (kokai) No. 55-170879). The permanent magnet generates a magnetic flux which links some turns of the winding. When a current is supplied to the winding, the current flowing through the turns of the winding interacts with the magnetic flux generated by the permanent magnet such as to move the permanent magnet. Additionally, the current flowing through each turn of the winding generates a magnetic flux within the stationary magnetic member.

In the above-mentioned prior art, therefore, when the stroke, i.e., the distance the permanent magnet moves, is increased without reducing the driving force, the cross-section of the stationary magnetic member must be increased in proportion to the increase in the stroke. This is because an increase in the stroke causes an increase in the number of turns of the stationary magnetic member, i.e., an increase in the magnetic flux within the stationary magnetic member. Therefore, in order to avoid saturation of the magnetic flux within the stationary magnetic member, if the stroke of the permanent magnet is doubled, the cross-section of the stationary magnetic member is also doubled, and the weight thereof is increased four fold, which is a disadvantage.

SUMMARY OF THE INVENTION

It is an object of the present invention to provide an electoromagnetic linear driving device in which the stroke of the movable permanent magnet is increased without increasing the cross-section of the stationary magnetic member.

According to the present invention, an additional winding is coiled around the stationary magnetic member at at least one terminal thereof. As a result, the two magnetic fluxes within the stationary magnetic member generated by the two windings oppose each other, causing a decrease in the magnetic flux within the stationary magnetic member, regardless of the stroke of the movable permanent magnet.

BRIEF DESCRIPTION OF THE DRAWINGS

The present invention will be more clearly understood from the description as set forth below with reference to the accompanying drawings, wherein:

FIG. 5 is an explanatory view illustrating the operation of the device of FIG. 3;

FIG. 6 is a schematic view of a linear motion type speedometer in which the device of FIG. 3 has been applied;

FIG. 7 is a cross-sectional view taken along line VII—VII of FIG. 6;

DESCRIPTION OF THE PREFERRED EMBODIMENTS

Figure 2:
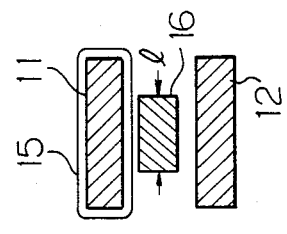
FIG. 2 is a cross-sectional view taken along line II—II in FIG. 1.
Figure 1:
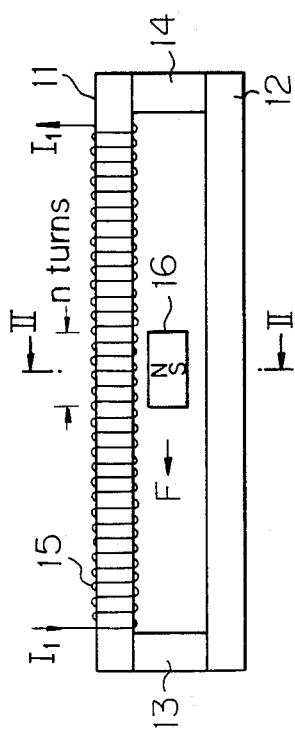
FIG. 1 is a schematic view of a prior art electromagnetic linear driving device.
Figure 4:
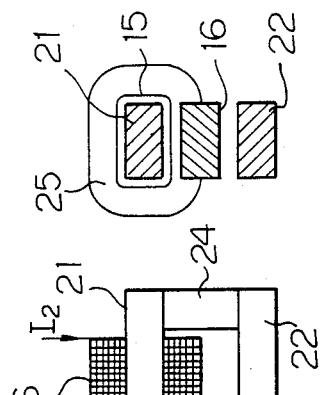
FIG. 4 is a cross-sectional view taken along line IV—IV in FIG. 3.
Figure 3:
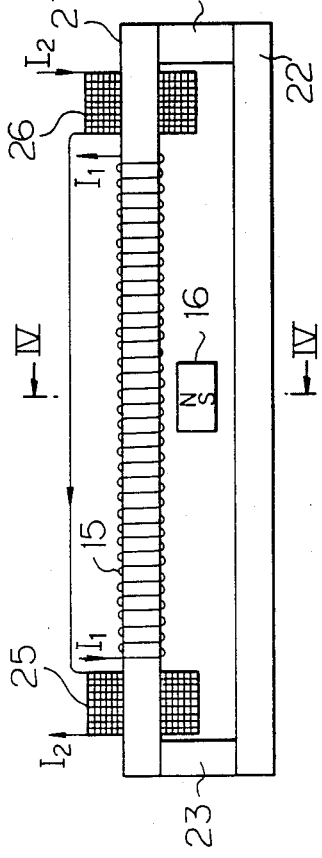
FIG. 3 is a schematic view illustrating a first embodiment of the electromagnetic linear driving device according to the present invention.

In FIGS. 1 and 2, which illustrate the prior art (See FIGS. 3, 4, and 5 of Japanese unexamined patent publication (kokai) No. 55-170879), reference numeral 11 designates a stationary magnetic member which forms a closed magnetic path, i.e., a magnetic circuit with other magnetic members 12, 13, and 14. Here the magnetic members 11 and 12 are parallel to each other with an air gap located therebetween. Wound around the stationary magnetic member 11 is a winding 15 having a plurality of turns spaced equidistantly. In addition, disposed in the air gap between the magnetic members 11 and 12 is a movable permanent magnet 16. The permanent magnet 16 generates a magnetic flux which perpendicularly crosses n turns of the winding 15. It should be noted that, in this case, the magnetic flux generated by the permanent magnet 16 links only the bottom sides of the n turns of the winding 15.

In the device of FIGS. 1 and 2, when a current $I_1$, is supplied to the winding 15, the following driving force F is applied to the permanent magnet 16 due to magnetic interaction:

$$F = BnlI_1 (N)$$

where
B is the density (Wb/m$^2$) of the magnetic flux generated by the permanent magnet 15;
n is the number of turns of the winding 15 facing the permanent magnet 16; and
l is the width (m) of the permanent magnet 16.

As a result, the permanent magnet 16 moves linearly along the stationary magnetic member 11.

Additionally, a magnetic flux due to the current $I_1$ flowing through the winding 15 is generated within the closed magnetic path, i.e., within the stationary magnetic member 11. The cross-section of the stationary magnetic member 11 is therefore designed to take into account the saturation characteristics of the magnetic flux within the stationary magnetic member 11.

The device of FIGS. 1 and 2 has a disadvantage in that the cross-section of the stationary magnetic member 11 must be increased proportional with the increase in the stroke of the permanent magnet 16, i.e., the moving distance thereof. That is, as the stroke of the permanent magnet 16 increases without a reduction in the driving force F, the total number of turns of the winding 15 also increases, causing the magnetic flux generated by the winding 15 within the stationary magnetic member 11 to increase.

In FIGS. 3 and 4, which illustrate a first embodiment of the present invention, the elements 21 through 24 correspond to the elements 11 through 14, respectively, of FIGS. 1 and 2. However, the cross-sections of each of the elements 21 through 24 are smaller than those of the corresponding elements in FIGS. 1 and 2. According to the present invention, windings 25 and 26 are wound tightly around the stationary magnetic member 21 at the terminals thereof, and the two windings 25 and 26 connected to each other.

In one instance, the number of turns of winding 15 is the same as the total number of turns of windings 25 and 26, and the direction of winding 15 is the same as that of windings 25 and 26. Here, the current $I_1$ flowing through winding 15 is the same as the current $I_2$ flowing through windings 25 and 26. However, the directions of currents $I_1$ and $I_2$ are opposite to each other. Therefore, in a closed magnetic path, the direction of the magnetic flux generated by winding 15 is opposite that of the magnetic flux generated by windings 25 and 26, thereby reducing the magnetic flux appearing within the stationary magnetic member 11.

The operation of the device of FIGS. 3 and 4 shall now be explained with reference to FIG. 5. Within the closed magnetic path formed by elements 21 through 24 of FIG. 3, there are generated the three following magnetic fluxes:

a magnetic flux $\phi_1$ generated by the permanent magnet 16;

a magnetic flux $\phi_2$ generated by winding 15; and a magnetic flux $\phi_3$ generated by windings 25 and 26.

As explained above, since magnetic fluxes $\phi_2$ and $\phi_3$ oppose each other, the substantial magnetic flux generated within the closed magnetic path is only dependent upon magnetic flux $\phi_1$. Therefore, even when the stroke of the permanent magnet 16, i.e., the length of the stationary magnetic member 21, is increased to increase the number of turns of the winding 15, it is unnecessary to increase the cross-section of the stationary magnetic member 21 since the magnetic flux within the member 21 remains substantially unchanged.

The device of FIGS. 5 and 6 can be applied to a speedometer for automobiles, as explained below with reference to FIGS. 6 and 7.

In FIGS. 6 and 7, the permanent magnet 16 is fixed to a rail guide 31 having a groove. The rail guide 31 is slidably held by two parallel slide bars 32, which are secured by a nonmagnetic holder 33 to the magnetic members 21 and 22. Also attached to the holder 33 is a front panel 35 with graduations marked thereupon. In addition, an indicator 34 is attached to the permanent magnet 16. In this case, the permanent magnet 16 is connected to one end of the holder 33 by a spring (not shown). When currents $I_1$ and $I_2$ corresponding to the vehicle speed are supplied to windings 15 and 25(26), respectively, the permanent magnet 16 with the indicator 34 moves until the driving force of the permanent magnet 16 balances with the spring rebound force. It is also possible to perform servo control by associating the permanent magnet 16 with a potentiometer.

Figure 8:
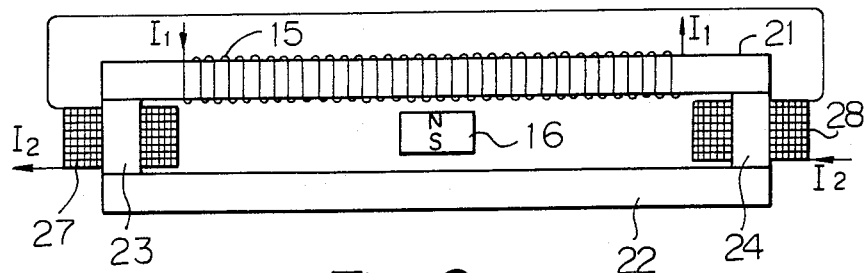
FIGS. 8, 9, and 10 are schematic views illustrating a second, third, and fourth embodiment of the electromagnetic linear driving device according to the present invention.

In FIG. 8, which illustrates a second embodiment of the present invention, windings 27 and 28 corresponding to the windings 25 and 26 of FIG. 3 are wound around the magnetic members 23 and 24, respectively. The device of FIG. 8 exhibits the same effect as the device of FIGS. 3 and 4.

Figure 9:
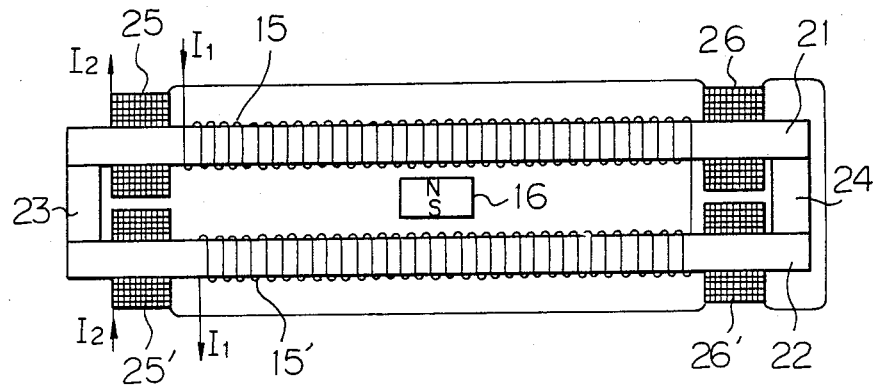

In FIG. 9, which illustrates a third embodiment of the present invention, a winding 26' connected to the winding 26 is wound around magnetic member 22, and windings 25' and 26' connected to windings 25 and 26 are wound around magnetic member 22 at the terminals thereof, thereby doubling the driving force of the permanent magnet 16.

Figures 10, 11:
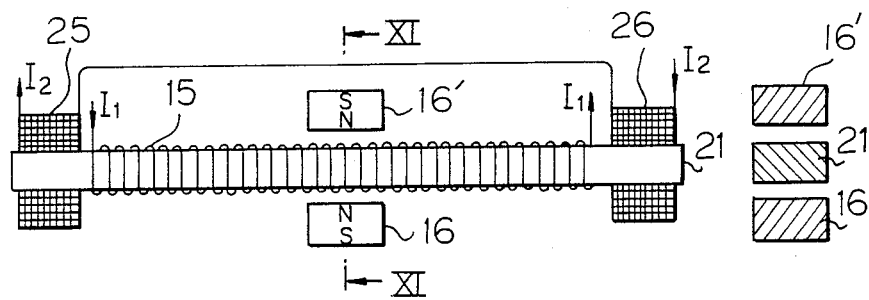
FIG. 11 is a cross-sectional view taken along the line XI—XI of FIG. 10.

In FIGS. 10 and 11, which illustrates a fourth embodiment of the present invention, only the magnetic member 21 is provided. An open magnetic path is formed in this case. In addition, another permanent magnet 16' is provided. Note that this permanent magnet 16' generates a magnetic flux which links the upper side of the turns of the winding 15. The magnetic poles of the magnet 16' are therefore reversed relative with those of the magnet 16. The device of FIG. 10 is light in weight, which is an advantage.

We claim:

1. An electromagnetic linear driving device comprising:

a first magnetic member having a longitudinal axis defining a longitudinal direction which member forms at least a portion of a magnetic circuit path;

a first winding wound around a central portion of said stationary magnetic member along said longitudinal direction for inducing, responsive to a first current flowing therein, a first magnetic flux in said magnetic circuit;

a second winding, wound around a terminal portion of said stationary magnetic member apart from said central portion thereof, for inducing, responsive to a second current flowing therein, a second magnetic flux in said stationary magnetic member, which second flux opposes said first magnetic flux; and a first permanent magnet having north (N) and south (S) poles defining a N-S axis, movable along a path substantially parallel to said longitudinal direction and along said central portion of said stationary magnetic member, for generating a magnetic flux linking at least some turns of said first winding, the N-S axis being substantially perpendicular to said longitudinal axis.

2. A device as set forth in claim 1, further comprising a second stationary magnetic member disposed substantially in parallel with said first stationary magnetic member and forming a portion of said magnetic circuit path, said permanent magnet being disposed between said two stationary magnetic members.

3. A device as set forth in claim 2, further comprising a third winding wound around said second stationary magnetic member along the longitudinal direction thereof, said third winding being connected to said first winding such that said first current flows in both said first and third windings.

4. A device as set forth in claim 3, further comprising a fourth winding wound around said second stationary magnetic member at at least one end portion thereof said forth winding inducing, responsive to a current flowing therein, a flux in said magnetic circuit opposing said first magnetic flux.

5. A device as set forth in claim 1, further comprising a second permanent magnet, movable along said stationary magnetic member, for generating a magnetic flux linking some turns of said first winding, said second permanent magnet being mechanically coupled to said first permanent magnet.

6. A device as set forth in claim 1, further comprising additional magnetic members forming additional portions of said magnetic circuit.

7. An electromagnetic linear driving device comprising:
- a first stationary magnetic member having a longitudinal axis defining a longitudinal direction;
- a second stationary magnetic member having a longitudinal axis substantially parallel to that of said first stationary magnetic member;
- third and fourth stationary magnetic members joining said first and second stationary magnetic members to form a complete magnetic circuit including said first, second, third and fourth members;
- a first winding wound around a central portion of said first stationary magnetic member along said longitudinal direction for inducing, responsive to a first current flowing therein, a first magnetic flux in said magnetic circuit;
- a second winding, wound around either said third or four stationary magnetic members and apart from said first winding for inducing responsive to a second current flowing therein a second magnetic flux in said magnetic circuit which opposes said first magnetic flux; and
- a first permanent magnet having a north (N) and south (S) poles defining a N-S axis, movable along a path substantially parallel to said longitudinal direction and corresponding to said central portion of said stationary magnetic member, for generating a magnetic flux linking some turns of said first winding, the N-S axis being substantially perpendicular to said longitudinal axis.

8. A device according to claim 7 further comprising a third winding wound around the other of said third and fourth stationary magnetic members for inducing responsive to a current flowing therein a flux in said magnetic circuit opposing the first magnetic flux.

* * * * *